F. J. ROGERS.
COMBINED ACCIDENT AND IDENTIFICATION CERTIFICATE OR POLICY.
APPLICATION FILED MAR. 13, 1918.

1,318,695.  Patented Oct. 14, 1919.

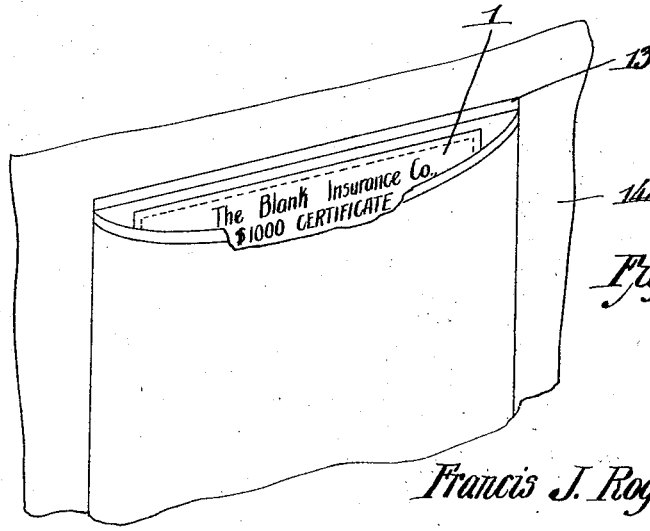

Fig. 1.

The Blank Insurance Co.
$1000 CERTIFICATE  47

If you meet with accidental death or accidental disability while traveling upon a common carrier where such death or disability is due to negligence of the common carrier, and if this certificate is found sewed to your garments at the time of the accident, the face value hereof will be paid by the above Insurance Co, to:-

NAME _____ or beneficiary

In case of accident notify _____

Merchant's name _____

This certificate expires one year from _____

— — — — — — — CUT HERE — — — — — — —

COUPON

The Blank Insurance Co., 47
Guarantees to pay $1000.00 to

NAME _____ or beneficiary in case of accidental death

Beneficiary's name _____
        Address _____

This coupon expires one year from _____

Fig. 2.

Inventor:
Francis J. Rogers:-

By _____,
Attorney.

UNITED STATES PATENT OFFICE.

FRANCIS J. ROGERS, OF PARKERSBURG, WEST VIRGINIA.

COMBINED ACCIDENT AND IDENTIFICATION CERTIFICATE OR POLICY.

1,318,695.	Specification of Letters Patent.	Patented Oct. 14, 1919.

Application filed March 13, 1918. Serial No. 222,128.

*To all whom it may concern:*

Be it known that I, FRANCIS J. ROGERS, a citizen of the United States, residing at Parkersburg, in the county of Wood and State of West Virginia, have invented new and useful Improvements in Combined Accident and Identification Certificates or Policies, of which the following is a specification.

This invention relates to a combined accident and identification certificate or policy, the object of the invention being to provide a policy which may be issued by a merchant to a customer purchasing a suit of clothing or other similar article, and which may be attached to one of the garments worn by the insured, whereby the policy may be readily and conveniently carried for inspection or display and protected against loss or displacement, and whereby in the event of the accidental death of or injury to the insured the policy may be found attached to his person for ready liquidation and also to serve as a means of identification of the person insured thereby.

A further object of the invention is to provide a certificate or policy of the character described which may be sewed to the garment of the wearer, which is composed of some suitable durable and moisture proof material adapted to permit of the suit being cleansed without liability of defacing the printed matter upon the policy or otherwise injuring the same, and which will not only identify the insured but will also serve as a means whereby the names of the insurance company and the merchant will be given, thus enabling them to be promptly communicated with by the proper authorities.

A still further object of the invention is to provide a policy of the character described which will serve as an advertising medium for the merchant, and a source of convenience to the customer in enabling him to obtain insurance against accident at little or no cost, and which additionally provides a means for ready and rapid identification of the insured individual.

The invention consists of the features of construction, combination and arrangement of parts, hereinafter fully described and claimed, reference being had to the accompanying drawing, in which:—

Figure 1 is a face view of a combined accident and identification certificate or policy embodying my invention.

Fig. 2 is a view indicating a mode in which the body of the policy may be attached to a garment of the insured.

Referring to the drawing 1 designates the policy or certificate as a whole, which comprises a body portion or section 2 and a coupon portion or section 3. These sections are preferably arranged one above the other, and are integral with each other, and adapted in practice to be separated along a transverse weakened line 4.

The sections 2 and 3 are provided with suitable identifying characters, such as the numeral 47, as shown in the present instance, for indicating their relationship, to wit, that they are parts of one and the same certificate or policy. Each section 2 and 3 is also provided with a suitable head indication or statement to indicate its character, the section 2 being provided in the present instance at the top with the indication "$1000 certificate" together with the pictorial illustration of a railway car, while the section 3 is provided at top with the identifying word "Coupon". The section 2 constitutes the policy proper, while the section 3 constitutes a record coupon designed to be held by the merchant or transmitted to the insurance company in order that a proper record of the issuance of the policy or certificate may be kept.

The section 2 is provided with a suitable statement of its purpose, or the terms or conditions under which it is issued, followed by a suitably designated line or space 5 to receive the name of the insured, which may be followed by the words "Or beneficiary", to indicate that in the event of accident the amount of the insurance will be paid either to the party insured or any person named by him. The section 2 is further provided with a suitably designated line or space 6 to receive the name of the merchant issuing the policy in his own name or as agent of the company, and this line is preceded by a suitable statement that this merchant or agent should be notified in the event of accident to the insured. A line or space 7 is further provided upon the section 2 to receive the date on which the policy is issued, and may be preceded by a suitable statement that the certificate expires at a certain period from said date.

The coupon section 3 is provided as at 8 with the name or title of the issuing company, which is followed by a statement that said company agrees to pay the sum of the policy to the insured or his beneficiary in case of accidental death, a suitably designated line or space 9 being provided to receive the name of the insured and suitable spaces 10 and 11 being provided to receive the name and address of the beneficiary. A space 12 is further provided on the coupon 3 to receive the date of issuance of the policy, and this may be preceded by a suitable statement that the coupon or policy expires at a certain period from said date.

In the use of the policy, it will be understood that a merchant selling a suit of clothes or other garment to a customer may issue the policy to such customer without charge, as a method of advertising, or may charge a small sum for the purpose, and that in issuing the policy the blank spaces are properly filled out and the sections 2 and 3 separated along the weakened transverse line 4. The body section 2 is then sewed to the lining 13 of the pocket of a coat or other garment 14, while the coupon section 3 is transmitted to the insurance company or proper official in charge of the insurance records, for the purpose of indicating that the policy has been issued and to enable full particulars relating thereto to be kept. It will, of course, be understood that the policy may be issued by a dealer and sewed to the suit at the time it is made or that the policies may be issued by a maker of ready made garments and applied to the garments when they are made, so that the policies may be rendered effective at the time of sale by the merchant selling the garments. A large establishment in the clothing trade, or small establishment buying goods from such large establishment, or making suitable arrangements with an accident insurance company, will thus be enabled to issue accident policies as a method of advertising to its customers, without charge to the customer or by merely adding a small sum to the selling price of the goods. In practice the policy may be made of any suitable durable and water proof cloth or other material of such a character as to permit the suit to be frequently cleaned without defacing or otherwise injuring the policy.

It will thus be understood that in the event of the death by accident of the insured, or injury to the insured, at any time while wearing a garment to which the policy is attached, the policy will become instantly effective, and at the same time will serve as a means of identification, whereby, in the event that it is necessary for others than the insured to take action, notice of the death of or injury to the insured may be immediately transmitted to the company as well as to the merchant. By this means the heirs or beneficiary of the insured may be readily and quickly reached and advised of the accident.

Having thus fully described my invention, I claim:—

As an article of manufacture, a combined advertising device, accident and identification insurance policy or certificate comprising integral body and coupon portions separable along a weakened line, said body portion adapted to be sewed to a garment and having inscribed thereon a suitable accident policy statement and designated spaces to receive the name of the insured and an advertiser issuing the policy, the said coupon section being removed from the said body prior to the attachment of the latter to the garment, the said coupon section having suitably designated spaces to receive the name of the insured and name and address of the beneficiary, and the said body and coupon sections being provided with like identifying elements.

In testimony whereof I affix my signature.

FRANCIS J. ROGERS.